US008887000B2

(12) United States Patent
Teranishi et al.

(10) Patent No.: US 8,887,000 B2
(45) Date of Patent: Nov. 11, 2014

(54) SAFETY DEVICE

(75) Inventors: Keiichi Teranishi, Numazu (JP); Yasuo Muneta, Kusatsu (JP); Chiaki Koshiro, Yokohama (JP); Naoaki Ikeno, Kusatsu (JP); Toshiyuki Nakamura, Ritto (JP); Hiromu Suganuma, Ohtsu (JP); Asahi Matsui, Tokyo (JP); Katsufumi Yoshida, Kusatsu (JP); Shohei Fujiwara, Ohtsu (JP); Takehiko Hioka, Ritto (JP)

(73) Assignee: Omron Corporation, Kyoto (JP)

( * ) Notice: Subject to any disclaimer, the term of this patent is extended or adjusted under 35 U.S.C. 154(b) by 1941 days.

(21) Appl. No.: 11/405,703

(22) Filed: Apr. 18, 2006

(65) Prior Publication Data

US 2006/0259837 A1    Nov. 16, 2006

(30) Foreign Application Priority Data

Apr. 19, 2005  (JP) .................. P2005-150095
Apr. 3, 2006   (JP) .................. P2006-102337

(51) Int. Cl.
*G06F 11/00*  (2006.01)
*G05B 19/042* (2006.01)
*G05B 19/05*  (2006.01)

(52) U.S. Cl.
CPC .. *G05B 19/0428* (2013.01); *G06F 2219/24054* (2013.01); *G05B 2219/25123* (2013.01); *G05B 2219/14054* (2013.01); *G05B 19/058* (2013.01)
USPC .......................................... 714/43

(58) Field of Classification Search
USPC .................... 714/43; 700/21, 79, 81
See application file for complete search history.

(56) References Cited

U.S. PATENT DOCUMENTS

| 4,817,045 | A  | * | 3/1989  | Faeser ........................ 700/293 |
| 6,176,247 | B1 | * | 1/2001  | Winchcomb et al. ........... 137/14 |
| 6,567,709 | B1 | * | 5/2003  | Malm et al. ..................... 700/21 |
| 6,647,301 | B1 | * | 11/2003 | Sederlund et al. ............. 700/79 |
| 6,701,198 | B1 | * | 3/2004  | Vandesteeg et al. ........... 700/79 |
| 6,909,923 | B2 | * | 6/2005  | Vasko et al. .................... 700/79 |
| 7,076,311 | B2 | * | 7/2006  | Schuster ........................ 700/21 |
| 7,621,293 | B2 | * | 11/2009 | Snowbarger .............. 137/487.5 |
| 2004/0199824 | A1 | * | 10/2004 | Harter ........................... 714/30 |
| 2004/0201287 | A1 |   | 10/2004 | Kagermeier et al. |
| 2005/0060606 | A1 | * | 3/2005  | Kalan et al. ................... 714/12 |

FOREIGN PATENT DOCUMENTS

| EP | 1 460 497      | 9/2004 |
| JP | 2004-297997    | 10/2004 |
| WO | WO-2004/091979 | 10/2004 |

* cited by examiner

*Primary Examiner* — Philip Guyton
(74) *Attorney, Agent, or Firm* — Foley & Lardner LLP

(57) ABSTRACT

A safety device of the invention includes at least one of an input unit having one or more input terminals and an output unit having one or more output terminals, a testing unit having one or more test terminals, a rewritable nonvolatile memory configured to store setting information of a terminal specification which can be set from outside via the tool, and wherein the terminal specification of the one or more test terminals included in the testing unit is determined in accordance with the setting information of the terminal specification.

9 Claims, 13 Drawing Sheets

| Channel mode | Explanation |
|---|---|
| Not Used | Corresponding test output is not used. |
| Standard Output | Connected to input of indicating lamp or PLC. used as monitor output. |
| Pulse Test Output | Relay output type device is connected in combination with a safety input terminal. |
| Power Supply Output | Connected to power source terminal of safety sensor. voltage fed from test output terminal to IO power source (V.G.) is output. |
| Muting Lamp Output | Only T3 is set as output of muting indicating lamp. disconnection of indicating lamp is detected when output is ON. |

Fig. 3

| Channel mode | Explanation |
|---|---|
| Not Used | Corresponding safety input terminal is not used. (External input device is not connected.) |
| Test pulse from test out | Relay output type device is connected in combination with a test output terminal. When this mode is selected, please select test output terminal from test sources and set mode of the test output terminal to "Pulse Test Output." With this, contact of input signal line to power source (the plus side) and short circulation with other input signal lines can be detected. |
| Used as safety input | Semiconductor output type device is connected. |
| Used as standard input | Non-safety device such as reset switch is connected. |

| Channel mode | Explanation |
|---|---|
| Not Used | Corresponding safety output terminal is not used. (External output device is not connected.) |
| Safety | Test pulse is not output when output is ON. (It remains ON.) |
| Safety Pulse Test | Test pulse is output when output is ON. With this, contact of output signal line to power source (the plus side) and short circulation between output signal lines can be detected. |

SAFETY DEVICE

CROSS-REFERENCE TO RELATED PATENT APPLICATIONS

Japanese Priority Application No. P2006-102337, filed Apr. 3, 2006, and P2005-150095, filed Apr. 19, 2005, including the specification, drawings, claims and abstract, are incorporated herein by reference in their entirety.

BACKGROUND OF THE INVENTION

1. Field of the Invention

The present invention relates to a safety device for use in safety, such as a safety network controller and a safety I/O terminal.

2. Description of the Related Art

With an increase of interest in workplace safety, various safety devices have been proposed in recent years (For example, see Japanese Patent Application Laid-Open No. 2004-297997). These devices correspond to a safety network controller or a safety I/O terminal and are used with a cutting machine, a severing machine, or a manufacturing robot having an arm. A safety standard will be explained with an example of a safety network controller. A safety network controller is configured to include a safety self-diagnosis function in addition to a logical calculation function and an input and output control function which are similar to those of a typical programmable controller (PLC) in order to maintain high reliability in its control. Such safety network controller is sometimes referred to as "safety controller" or "safety master controller." The safety network controller includes a function for performing a compulsory safety control (fail safe control) not to pose a danger by own control when an abnormality is detected in the result of the self-diagnosis. Accordingly, it prevents operations of the manufacturing robot from posing a danger. In more detail, "safety" stated here includes normalized safety standards. For example, IEC61508 and EN standard are known. According to the IEC61508 (International Electrotechnical Commission related to functional safety of programmable electronic systems), a probability of dangerous trouble (a probability of failure per hour) is defined and SIL level (Safety Integrity Level) is classified in four levels based on the probability. The EN standard evaluates degree of risk and requires a process for risk reduction. In EN954-1, there are five safety categories. The safety network controller or the like according to the present invention is compliant with one of these safety standards. The safety I/O terminal also includes a self-diagnosis function and a fail safe function for controlling not to pose a danger by own control when an abnormality is detected in the result of the self-diagnosis. Accordingly, it is prevented that danger is caused by an operation of the safety network controller or an operation of the manufacturing robot. Here, the safety I/O terminal is sometimes referred to as "safety slave station," "safety slave unit," or "safety slave."

Conventionally, a safety control system in which a safety network controller and a safety I/O terminal are connected via a network is known. The safety network controller includes a communication master function for communicating with the safety I/O terminal and it is sometimes referred to as a safety master.

The safety I/O terminal includes a network communication function for communicating with the communication master function of the safety network controller, that is, a communication slave function controlled based on a master. The safety I/O terminal has a connecting terminal to which at least one of an input device such as a switch for outputting an on-off signal and an output device as a destination of a control signal is connected. As examples of the input device, there are an emergency stop switch SW, a light curtain, a door switch, and a two-hand switch. As examples of the output device, there are a safety relay and a contactor. These input device and output device are also compliant with safety standards. The safety I/O terminal generates control data based on a signal input from a connected input device and transmits the generated control data to the safety network controller via a network.

As a safety network controller, building type safety network controller which is composed of combination of a plurality of units such as a CPU unit, power source unit, I/O unit, and communication master unit. Each unit is coupled to a common internal bus and the CPU unit which governs the control of entire safety network controller communicates with other units via the bus to transmit and receive data. The coupled I/O unit also includes a connecting terminal to which an input device or an output device for use in safety is connected. The safety network controller inputs an input signal which is input from the safety I/O terminal via the communication master unit by network communication or an input signal of the input device connected to the coupled I/O unit and performs logical calculation for on/off of the input signal in use of a communication program. The safety network terminal outputs an output signal based on the calculation result to the safety I/O terminal via the communication master unit by network communication or the coupled I/O unit. The I/O unit and the safety I/O terminal output the output signal to the output device. By repeating this series of operation, the entire system including the manufacturing robot is controlled by the safety network controller. The communication cycle between the safety network controller and the safety I/O terminal may or may not be in synchronization with the cycle of the repetitive operation of the safety network controller.

The safety relay or the contactor as the output device connected to the safety I/O terminal is connected to the manufacturing robot, processing machine, severing machine or the like. The manufacturing robot or the like operates when the contact point with the relay or the contactor is on and the manufacturing robot or the like stops operating when the contact point is off. Accordingly, the safety network controller carries out control regarding operation stop of the operating robot or the like to be controlled by controlling on-off of the output device. Specifically, when a proper operation of an emergency stop switch SW is input from the safety I/O terminal via a network, the safety network controller turns off the output device (relay or contactor) to prevent the controlled subject from operating dangerously or promptly carries out a compulsory control in a safe condition and a necessary safety process. When a diagnosis result including abnormality of the emergency stop switch SW or other input devices is input, the safety network controller turns off the output device in order to stop the operation and prevent the controlled subject from operating dangerously or promptly carries out a compulsory control in a safe condition and a necessary safety process regardless of whether or not the emergency stop switch SW is operated or the input device is on. The I/O unit coupled with the safety network controller or the safety I/O terminal includes an input unit having one or more input terminals, an output unit having one or more output terminals, an/or a testing unit having one or more test terminals.

Here, "and/or" is used since a safety device for inputting generally does not include an output unit and a safety device for outputting generally dose not include an input unit. Further, in general, almost all safety devices include a testing unit.

Resent safety devices (for example, a safety network controller and a safety I/O terminal) are more downsized in relation to mounting spaces so that the number of terminals included in the input unit, the output unit, and the testing unit are restricted. As a result, it is more difficult to obtain a combination of the most preferable terminal specification in accordance with a relevant system while maintaining enough number of terminals. Especially, the number of test terminals and test terminal specifications, which constitute the testing unit, has been a more serious problem for product optimization due to diversification of input devices and output devices. In other words, in the I/O unit or the safety I/O terminal, the maximum number of terminals to be provided is limited in relation to space of housing surface although it is preferable that many input devices or output devices can be connected to a single I/O unit of safety I/O terminal. Accordingly, there has been a problem that the number of input terminals or output terminals reduces as the number of test terminals increases.

The present invention has been made in view of such technical background and has an object of providing a safety device that is flexibly adaptable to input devices and output devices having various functions and terminal structures with a single safety device.

Other objects and effects of the present invention should be easily appreciated by a person skilled in the art with reference to the following description.

SUMMARY OF THE INVENTION

A safety I/O terminal according to the present invention is for connecting to an input device designed based on a safety standard, to which an on-off signal is input, connecting to a safety controller designed based on a safety standard via a network, and transmitting the signal input from the input device to a communication master unit of the safety controller, including: one or more input terminals configured to be given the input signal from the input device compliant with the safety standard; a test terminal configured to be shared in at least one of a test out specification, a nonuse specification, a standard output specification, a power supply specification, and a muting lamp specification; a memory configured to store content of specification setting regarding the test terminal; and a microcomputer configured to output a test signal for determining presence of abnormality when the test terminal specification is the test out specification and carrying out a process regarding the test terminal based on the specification when the test terminal specification is one of the other specifications, in accordance with the content of setting in the memory. With such structure, the test terminal of the safety I/O terminal can be utilized in many ways. Here, the specification of the test terminal is a combination of at least one of the test out specification, the nonuse specification, the standard output specification, the power supply specification, and the muting lamp specification. For example, a combination of the test out specification and the nonuse specification, a combination of the test out specification and the standard output specification, a combination of test out specification and the power supply specification, a combination of the test out specification and the muting lamp specification, a combination of the test out specification, the nonuse specification, and the standard output specification, and a combination of the test out specification, the standard output specification, and the power supply specification may be employed. All combinations are not explained here, but other combinations including the test out specification can be applied. The microcomputer of the safety I/O terminal is not limited to a microcomputer that is adapted to all of the five specifications but includes a microcomputer that is adapted to two specifications including the test out specification and one of the other specifications, three specifications including the test Out specification and two of the other specifications, or four specifications including the test out specification and three of the other specifications.

A safety I/O terminal of the present invention is for connecting to an input device designed based on safety standards, to which an on-off signal is input, connecting to a safety controller designed based on safety standards via a network, and transmitting the signal input from the input device to a communication master unit of the safety controller, including: one or more input terminals configured to be given the input signal from the input device compliant with the safety standard; a test terminal configured to be shared in two or more of a test out specification, a muting lamp specification, a power supply specification, a standard output specification, and a nonuse specification; a memory configured to store content of specification setting regarding the test terminal; and a microcomputer configured to switch processes regarding the test terminal in accordance with the content of setting in the memory. Here, the combinations of the specification of the test terminal are, for example, a combination of the test out specification and the muting lamp specification, a combination of the muting lamp specification, the power supply specification, a combination of the power supply specification and the standard output specification, a combination of the standard output specification and the nonuse specification, a combination of the muting lamp specification, the nonuse specification, and the standard output specification, and a combination of the muting lamp specification, the standard output specification, and the power supply specification may be employed. All combinations are not explained here, but other combinations any two, any three, any four, or all of the test out specification, the muting lamp specification, the power supply specification, the standard output specification, and the nonuse specification. Further, the microcomputer of the safety I/O terminal is not limited to a microcomputer that is adapted to all of the five specifications but includes a microcomputer that is adapted to only two specifications, three specifications, or four specifications.

The safety I/O terminal may be provided so that the safety I/O terminal is connected so as to communicate with a setting tool device for setting operation for the test terminal, a preferable specification regarding the test terminal is determined by receiving a signal of setting operation from the setting tool device, the content of setting is stored in the memory, and after the setting, the microcomputer switches processes regarding the test terminal in accordance with the content of setting in the memory.

A safety device of the present invention including at least one of an input unit having one or more input terminals and an output unit having one or more output terminals; a testing unit having one or more test terminals, a rewritable nonvolatile memory configured to store terminal specification setting information which can be set from outside via the tool, and terminal specification of the one or more test terminals included in the testing unit is determined in accordance with the content of the terminal specification setting information.

With such structure, terminal specification for one or more test terminals included in the testing unit may be changed by arbitrarily rewriting the terminal specification setting information from outside via the tool. Accordingly, with limited number of terminals, terminal specification can be switched according to an input device or output device to be controlled. As a result, it can be flexibly adaptable to the input device or output device having various functions or terminal structures with a single safety device.

According to a preferable embodiment of the present invention, terminal specification of the one or more input terminals included in the input terminal may be also determined in accordance with the content of the terminal specification setting information. With such structure, it can be flexibly adaptable to input devices to be controlled by switching various specifications for not only the test terminal but also the input terminal.

According to a preferable embodiment of the present invention, terminal specification of the one or more output terminals included in the output terminal may be also determined in accordance with the content of the terminal specification setting information. With such structure, it can be flexibly adaptable to various output devices to be controlled by rewriting the content of the terminal specification setting information via the tool to switch the terminal specification of the output terminal to a preferable specification.

According to a preferable embodiment of the present invention, terminal specifications of the one or more input terminals included in the input terminal and the one or more output terminals included in the output terminal may be also determined in accordance with the content of the terminal specification setting information With such structure, it can be flexibly adaptable to both of input devices and output devices to be controlled by rewriting the content of the terminal specification setting information via the tool to switch the terminal specification of the output terminal to a preferable specification.

Here, the terminal specification of the test terminal may include one or more of the test out specification, the muting lamp specification, the power supply specification, the standard output specification, and the nonuse specification.

The terminal specification of the input terminal may include one or more of the safety input specification, the standard specification, and the nonuse specification.

The terminal specification of the output terminal may include one or more of the safety output specification, the standard specification, and the nonuse specification.

According to the present invention, a safety device flexibly adaptable to an input device and an output device having various functions and terminal structures with a single safety device can be provided.

BRIEF DESCRIPTION OF THE DRAWINGS

FIG. 3 shows a table of setting specifications regarding a test terminal;

FIG. 4 shows a table of setting specifications regarding an input terminal;

FIG. 5 shows a table of setting specifications regarding an output terminal;

DETAILED DESCRIPTION OF THE PREFERRED EMBODIMENTS

A preferred embodiment of a safety device of the present invention will be described in detail with reference to the drawings.

Figure 1:
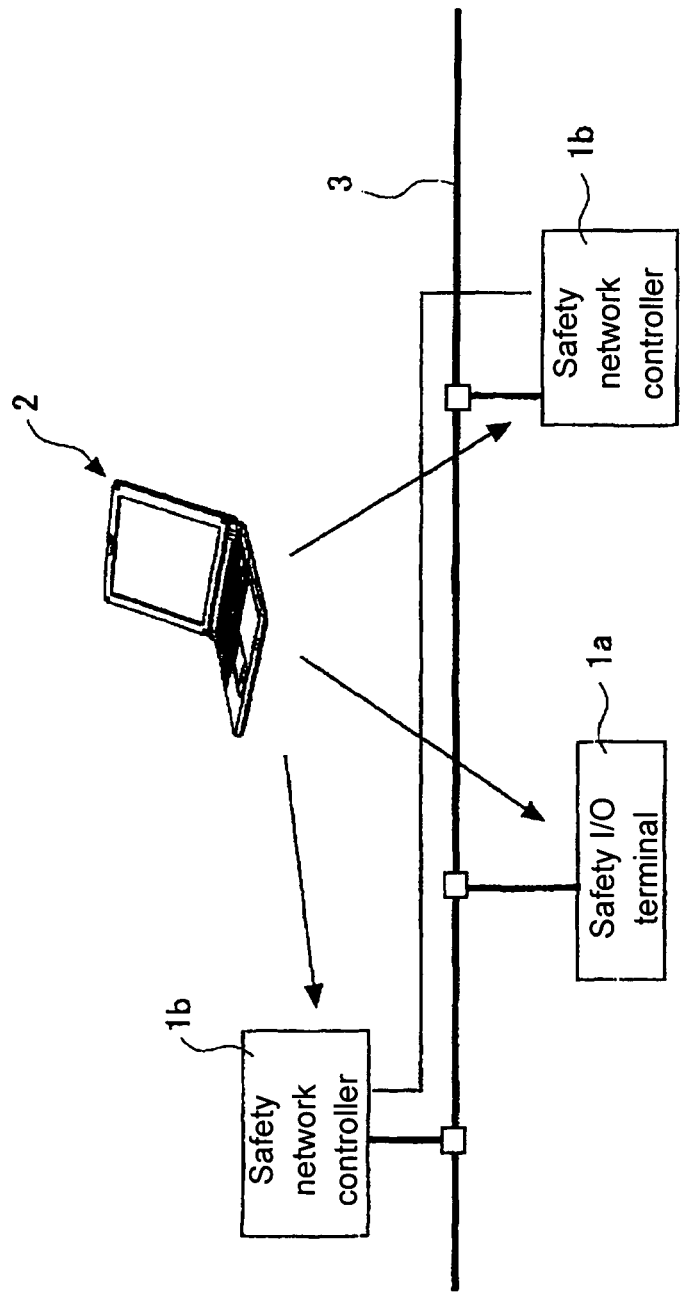
FIG. 1 shows a conceptual diagram of a terminal specification setting operation.

FIG. 1 shows a conceptual diagram of a terminal specification setting operation according to the present invention. In the drawing, 1a represents a safety I/O terminal; 1b represents a safety network controller; 2 represents a computer as a setting tool device for configuration; and 3 represents a network for connecting the safety I/O terminal 1a and the safety network controller 1b.

The computer 2 as a setting tool device is configured to communicate with the safety I/O terminal 1a and the safety network controller 1b. The computer 2 may communicates with the safety I/O terminal 1a and the safety network controller 1b via the network 3 or directly via interfaces (such as RS 232C) provided in each safety device (the safety I/O terminal 1a and the safety network controller 1b).

Figure 13:
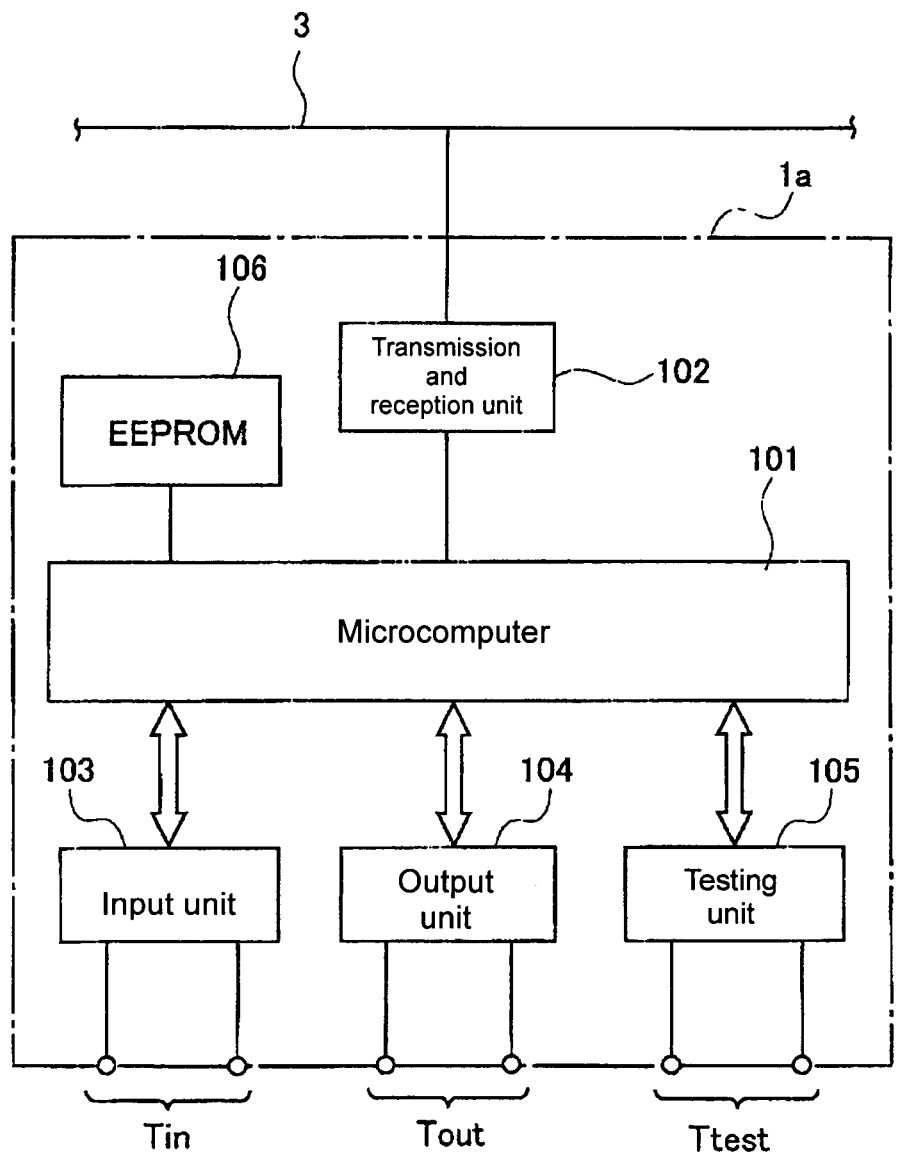
FIG. 13 shows a basic block diagram of a safety I/O terminal.

FIG. 13 shows a basic block diagram of the safety I/O terminal 1a as a safety device. As shown in the figure, the safety I/O terminal 1a includes a microcomputer 101, a transmission and reception unit 102, an input unit 103, an output unit 104, and a testing unit 105. The microcomputer 101 and the transmission and reception unit 102 realize a function for communicating with the safety network controller 1b and the setting tool device 2. In other words, input signal required for logical program calculation in the safety network controller 1b is transmitted and the logical program calculation result in the safety network controller 1b is received. In this I/O data communication, a request signal is transmitted by a communication master function of the safety network controller 1b and when the safety I/O terminal 1a receives the request signal, an input signal is transmitted (returned) as a response. The communication master function of the safety network controller 1b receives the response to receive the input signal. On the other hand, the communication master function of the safety network controller 1b transmits an output signal and the safety I/O terminal 1a receives the signal to receive the output signal. The communication cycle of the I/O data communication may or may not be synchronization with the cycle of repetitive operation of the safety network controller 1b. The input unit 103 includes one or more input terminals Tin. As described above, the input terminal Tin is connected to an input device for use in safety, such as an emergency stop switch SW, light curtain, door switch, or two-hand switch (not shown). The output unit 104 includes one or more output terminals Tout. As described above, the output terminal Tout is connected to an output device for use in safety, such as a safety relay or contactor (not shown). The safety relay or the contactor as the output device is connected to a manufacturing robot, processing machine, cutting machine or the like. Those devices operate when the contact point with the relay or the contactor is on, and stop operation when the contact point is off. The testing unit 105 includes one or more test terminals Ttest.

An EEPROM 106 is configured to function as an erasable nonvolatile memory. The EEPROM 106 stores terminal specification setting information and the terminal specification setting information can be rewritten from the computer 2 via the transmission and reception unit 102.

FIG. 3 shows a table of setting specifications regarding the test terminal. As shown in the figure, five setting specifications regarding the test terminal are provided and those are Nonuse specification (Not Used), Standard Output specification (Standard Output), Test Out specification (Pulse Test Output), Power Supply specification (Power Supply Output), and Muting Lamp specification (Muting Lamp Output). Here, the "Nonuse specification" is for stopping use of corresponding test outputs. In this specification, all the test terminals Ttest are not used and any other specifications explained below are not used. The "Standard Output specification" is for using the terminals as monitoring output by connecting to an indicating lamp or a PLC. Here, a signal related to normality (in a normal operation) and abnormality (in an abnormal operation) of operating conditions of the safety I/O terminal itself is transmitted from the test signal terminal Ttest. When the test terminal Ttest is connected to a PLC, the PLC receives the signal and operates in accordance with the signal. When the test terminal Ttest is connected to an indicating lamp, the indicating lamp is lighted or blinked in accordance with the signal. A pair of test terminals is generally used for the connection with the PLC or indicating lamp. Further, "Test Out specification" is performed by connecting a contact output device with the safety input terminal. In the Test Out specification, an input device corresponding to the test terminal Ttest is connected and a predetermined pulse signal pattern is output from the test terminal to the input device. The safety I/O terminal 1a reads the content of the signal to check whether or not the signal is transmitted properly via a relevant input device and determines normality or abnormality of the condition of the input device. That is, a structure in which pulse signal input to the input device is simply transferred through the input device is provided. Here, in addition to simply transfer through the input device, a function for generating a response signal separately based on a correct input of the pulse signal and transmitting the response signal or other similar structure may be employed. When the response signal from the safety I/O terminal 1a is not normal, it is determined that the input device is in an abnormal condition or wiring with the input device is in an abnormal condition (disconnecting or short circulation). In this way, upon cooperation between the safety I/O terminal 1a and the input device, normality or abnormality can be determined accurately. Here, the same thing may be carried out for the output device. A structure for returning a signal in accordance with an input pulse signal is provided to the output device and the safety I/O terminal 1a inputs the response signal from another terminal. In this way upon cooperation between the safety I/O terminal 1a and the output device, normality or abnormality can be determined accurately. In this specification, a pair of test terminals Ttest may be employed. Here, one is used for outputting a test signal and another is used for inputting a response signal. Or, a test terminal Ttest and an input terminal Tin may be employed. Here, the test terminal is used for outputting a test signal and the input terminal is used for inputting a response signal. Further, when the "Test Out specification" is used, a test terminal Ttest is shared by a plurality of input devices and each device and the test terminal are connected in series individually.

The "Power Supply specification" is for connecting to a power supply terminal of a safety sensor and power voltage is fed to IO power source (V, G) from a test output terminal. In this specification, the safety I/O terminal 1a as a power source feeds to the connected input device or output device. A pair of test terminals is also employed in this specification. Here, three test terminals may be employed as a power plus line, power minus line, and a ground line.

The "Muting Lamp specification" is for setting only T3 as an output of muting indicating lamp and a disconnection of the indicating lamp can be detected when the output is on. In this specification, any pair of test terminals (T3) among the plurality of test terminals Ttest is connected to the muting indicating lamp. As described above, the five subjects to be set are called as "test terminal," but they are used for testing only when "Test Out specification" and it can be said that other specifications are not for testing. Therefore, it is obvious that the terminal corresponding to the test terminal may be referred in other names such as "multifunctional terminal" or "utility terminal."

FIG. 4 shows a table of setting specifications regarding the input terminal Tin. As shown in the figure, four setting specifications regarding the input terminal are provided and those are Nonuse specification (Not Used), Test Out specification (Test pulse from test out), Safety Input specification (Used as safety input), and Standard Input specification (Used as standard input). Here, in the "Nonuse specification," the relevant safety input terminal Tin is not used and it is employed when an external input device is not connected. In the "Test Out specification," a contact output device (that is, an input device) is connected to the test output terminal Ttest. When this mode is selected, the test output terminal used for a test source is selected and the mode of the test output terminal is set to "Pulse Test Output." Concretely, in the "Test Out specification," the specification of the test terminal Ttest is set to "Test Out specification." Here, as described above, the test terminal Ttest and the input device corresponding to the input terminal Tin are connected, a pulse signal is output from the test terminal to the input device, and a response signal from the input device is input from the input terminal. The safety I/O terminal 1a determines normality or abnormality of the relevant input device condition in accordance with the reception condition of the response signal from the input device. It is determined as a normal condition when the response condition is in a proper condition and it is determined as an abnormal condition when the response condition is not in a proper condition. Here, the microcomputer 101 of the safety I/O terminal 1a is configured to generate a pulse signal for testing, perform a pulse signal output process, and determine normality and abnormality. Accordingly, a contact of the input signal line connecting to power source (the plus side), short circulation with other input signal lines and abnormality in the input devices can be detected.

In the "Safety Input specification," a semiconductor output type device is connected. The semiconductor output type device is an input device for outputting on-off signals with an output element such as transistor. Concretely, for example, it may be a noncontact type input device such as a photoelectric sensor or a proximity sensor. When the "Safety Input specification" is not set, a connect type input device is connected. Further, in the "Safety Input specification," non-safety device such as a reset switch is connected. The non-safety switch is an input device, which is not provided with a safety design, and it is a standard type input device which des not satisfy safety standards such as IEC61508 or the EN standard.

FIG. 5 shows a table of setting specifications regarding the output terminal Tout. As shown in the figure, three setting specifications regarding the input terminals are provided and those are Nonuse specification (Not Used), Safety Input specification (Safety), and Safety Pulse Test specification (Safety Pulse Test). Here, in the "Nonuse specification," the relevant safety output terminal is not used and an external output device is not connected. In the "Safety Input specification," test pulse is not output when output is on and the setting is always on. Further, in the "Safety Pulse Test specification," test pulse is output when output is on. Concretely, a predetermined pulse signal pattern is output from the test terminal to the output device which is connected to the output terminal Tout. The output device has a structure for determining whether or not a test pulse is transmitted from an output-on signal from the safety I/O terminal 1a. The output device determines normality when receiving a proper test pulse transmitted from the safety I/O terminal 1a and determines abnormality when receiving improper test pulse pattern or receiving nothing. With this, a contact of the output signal line to power source (the plus side) at wiring with the safety I/O terminal 1a, short circulation between the output signal lines and an abnormality in the safety I/O terminal 1a can be detected in the output device. Further, the output device may have a structure in which a pulse signal transmitted from the safety I/O terminal 1a is simply transferred as a response or a predetermined processed signal is transmitted to the safety I/O terminal 1a. The safety I/O terminal 1a determines normality when receiving a response signal via the output terminal properly as a response to the pulse signal transmitted to the output device and determines abnormality when receiving improper response signal pattern or receiving nothing.

As described above, in the safety I/O terminal, there are five specifications for the test terminal, three specifications for the output terminal, and four specifications for input terminal, respectively.

Figure 2:
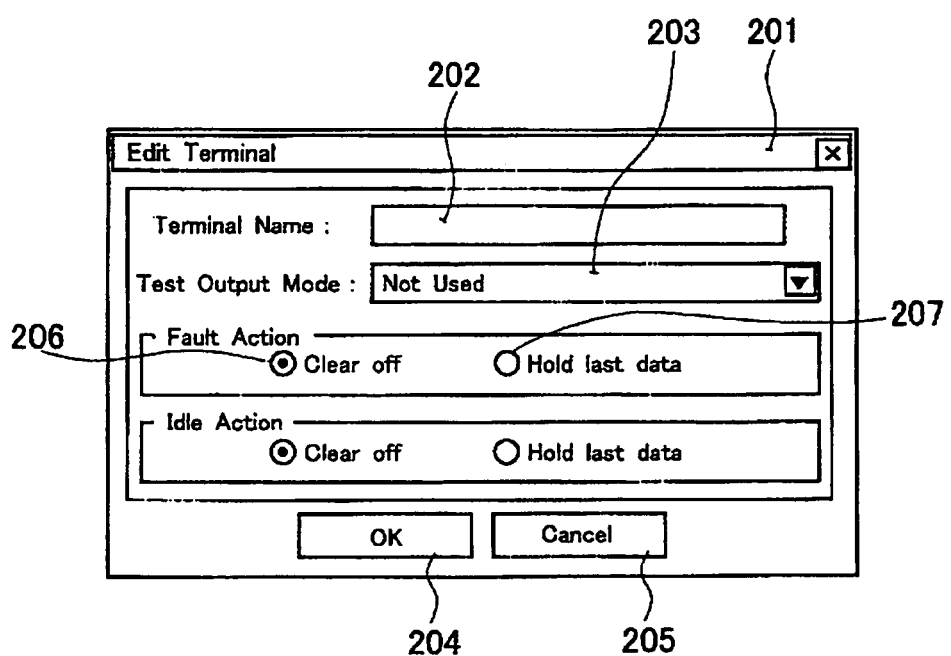
FIG. 2 shows an explanatory diagram a setting screen of a configurator.

On the other hand, FIG. 2 shows an explanatory diagram of a setting screen of the computer 2 constituting a configurator as a setting tool device. In the figure, 201 represents a window area on a setting screen, 202 represents a terminal name entity field, 203 represents a terminal specification entity field, 204 is a OK button, 205 is a cancel button, 206 is a clear off button, and 207 is a hold last data button. When a predetermined terminal name is typed to the terminal name entity field 202, a desired terminal specification is typed to the terminal specification entity field 203, and the OK button 204 is clicked on, the obtained terminal specification setting information is transmitted from the computer 2 to the safety I/O terminal 1a and stored in the EEPROM 106 with a function of the microcomputer 101. Then, according to the terminal specification setting information stored in the EEPROM 106, the testing unit 105 is controlled by the microcomputer 101. Accordingly, regarding the test terminal Ttest, a preferable terminal specification is determined.

Figure 6:
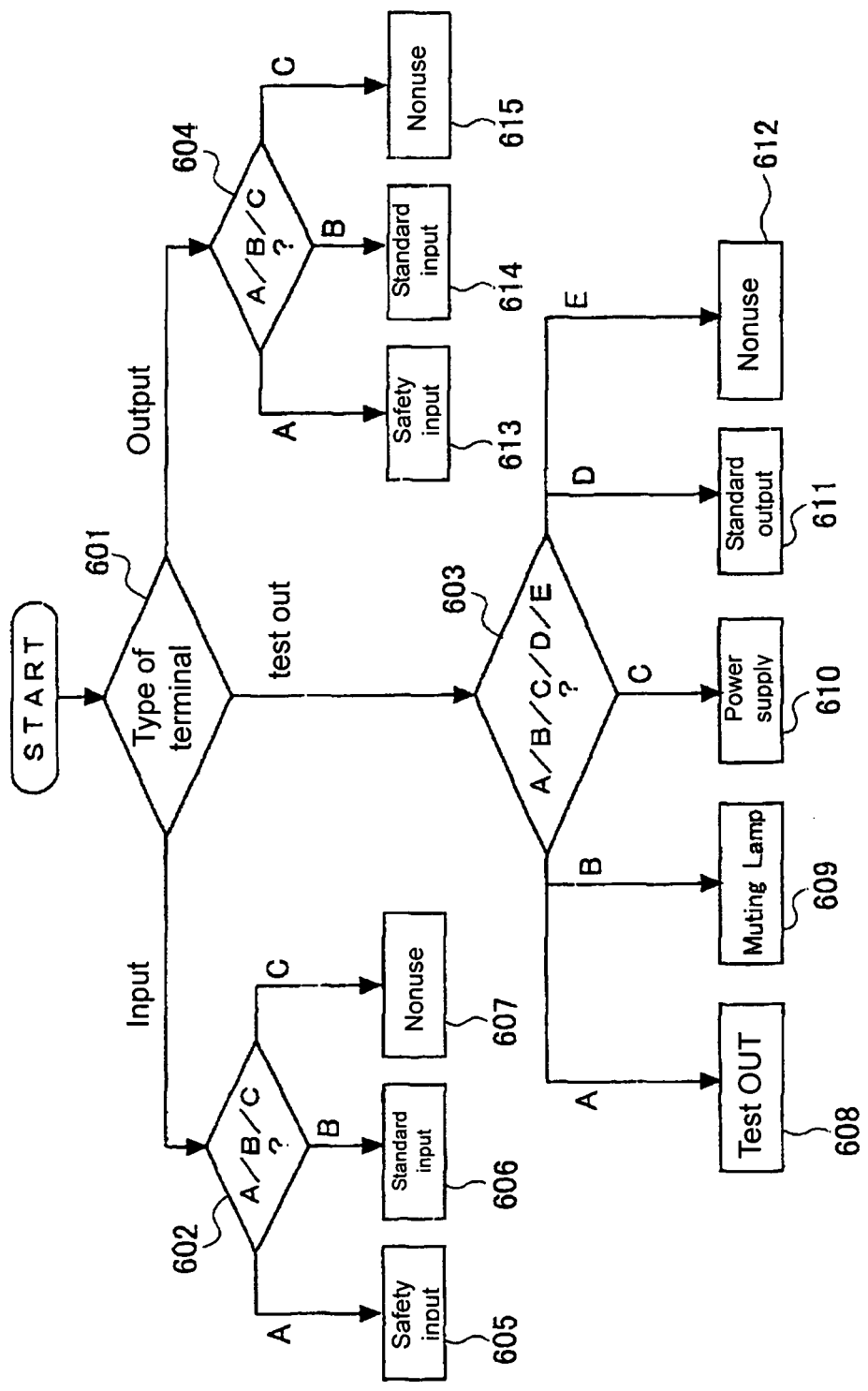
FIG. 6 shows a flowchart of a terminal specification determination process according to setting information.

FIG. 6 shows a flowchart of a terminal specification determination process according to setting information which is executed by the microcomputer 101 of the safety I/O terminal 1a. As shown in the figure, firstly, a type of terminal is determined among the terminal belonging to any types of "input," "test out," or "output" in step 601.

When it is determined as "input" in step 601, a specification setting for the input terminal is determined among the Nonuse specification, the Test Out specification, Safety Input specification, and Standard Input specification, in step 602. In accordance with those determination results, an operation specification of the input unit 103 is determined. As a result, with the testing unit 105 is required, a terminal specification of a relevant test terminal may also be determined when cooperation. Then, when the safety I/O terminal operates in actual, the input unit 103 and the microcomputer 101 execute one of a safety input determination process (step 605), a standard input determination process (step 606), a nonuse process (step 607), and a process in the specification of Test pulse from test out.

When the terminal is determined as "Test Out" in step 601, a specification setting for the test terminal Ttest is determined among "Test Out," "Muting Lamp Output," "Power Supply," "Standard Output," and "Nonuse" in step 603. In accordance with those results, when the safety I/O terminal operates in actual, the testing unit 105 and the microcomputer 101 execute one of a test Out determination process (step 608), a muting lamp determination process (step 609), a power supply determination process (step 610), a standard output determination process (step 611), and a nonuse process (step 612).

When the terminal is determined as "output" in step 601, a specification setting for the output terminal is determined among "Safety Input," "Safety Pulse Test," and "Nonuse" in step 604. Accordingly, the terminal specification of the output terminal Tout is determined. Then, when the safety I/O terminal operates in actual, the output unit 103 and the microcomputer 101 execute one of a safety input determination process (step 613), a standard input determination process (step 614), and nonuse process (step 615).

Figure 7:
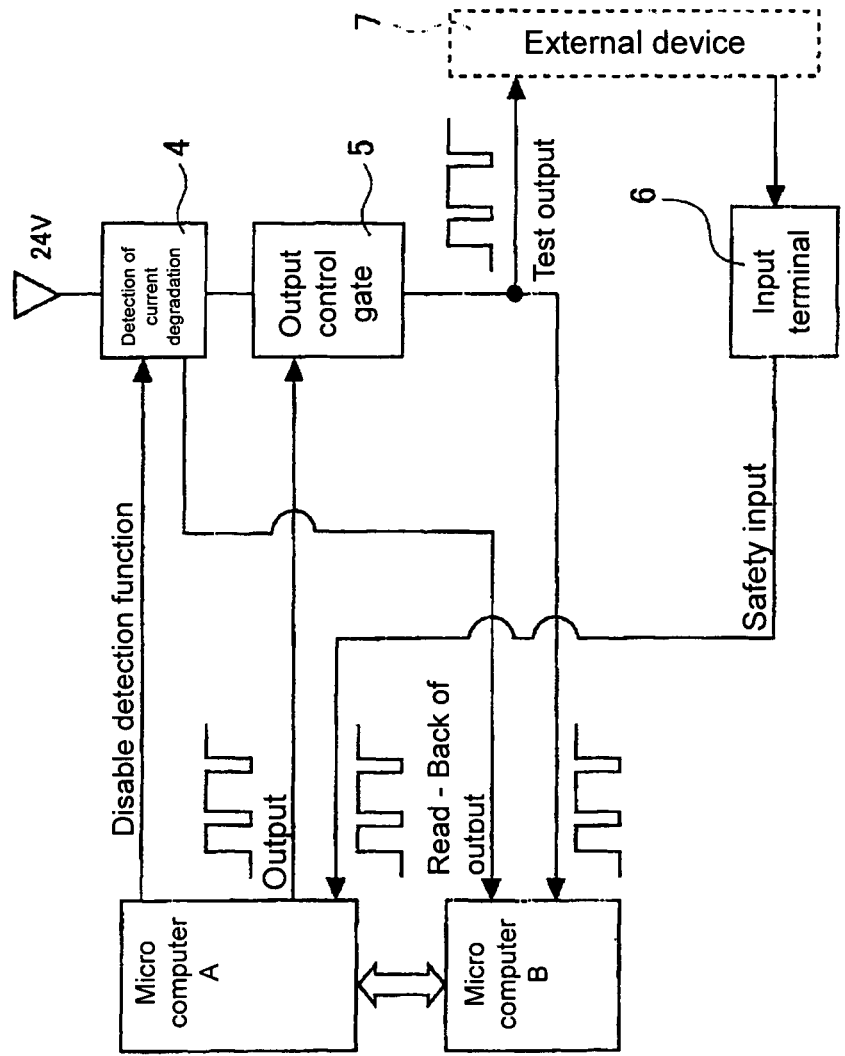
FIG. 7 shows an explanatory diagram of an operation related to the test terminal (Test Out specification)

FIG. 7 shows an explanatory diagram of an operation related to the test terminal which is set in Test Out specification. As shown in the figure, the microcomputer 101 is composed of two microcomputers (A, B). In the figure, 4 represents a current degradation detecting unit, 5 represents an output control gate, 6 represents an input terminal unit, and 7 represents an external device. The output control gate 5 corresponds to the test output unit and a pulse signal generated in the output control gate 5 is output from the test terminal Ttest. The external device corresponds to an input device.

In this Test Out specification, the test terminal Ttest and the input terminal Tin are used in pair and carries out pulsed output (it changes as on-off-on). As described above, in the Test Out specification, a pulse signal output from the test terminal is transmitted via a corresponding input device. The microcomputer A checks whether or not it is in a normal condition based on read-back of the output and safety input. In other words, the microcomputer A monitors the pulse signal is transmitted properly to determine its normality when a pulse signal as a response is input properly and determine its abnormality when a pulse signal as a response is not input properly. Here, the "abnormality" includes abnormality in the input device and abnormality in the wiring with the input device. The structure for responding the pulse signal in the input device may be a structure for simply transferring the pulse signal internally or a structure for generating a response signal and transmitting the response signal. With such structure, normality and abnormality of the input device can be judged in the safety I/O terminal 1a.

Figure 8:
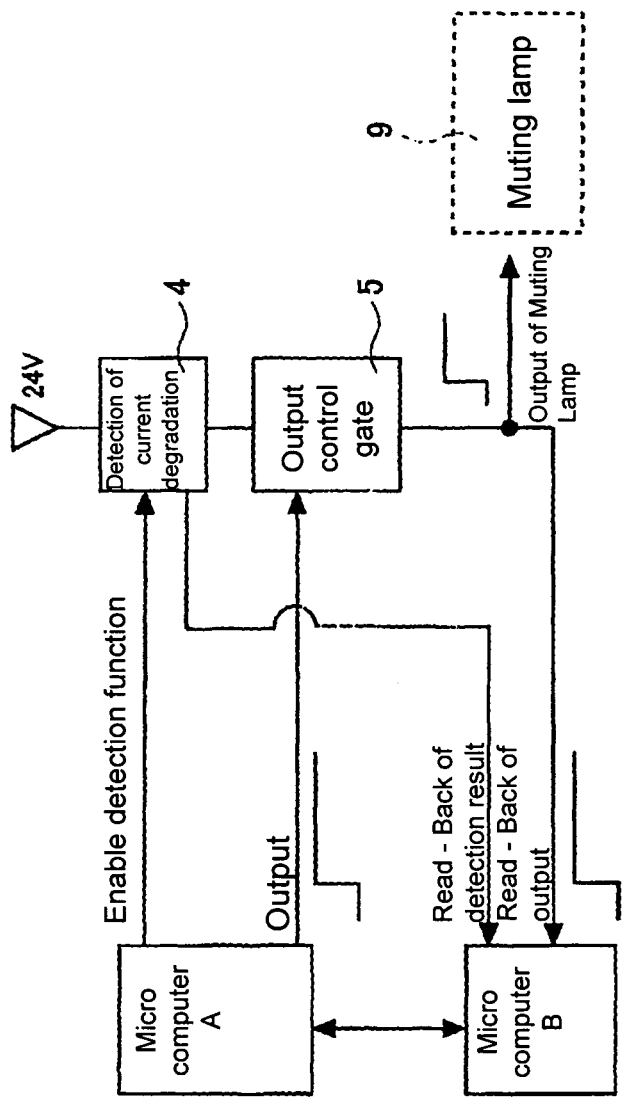
FIG. 8 shows an explanatory diagram of an operation related to the test terminal (Muting Lamp specification)
Figure 9:
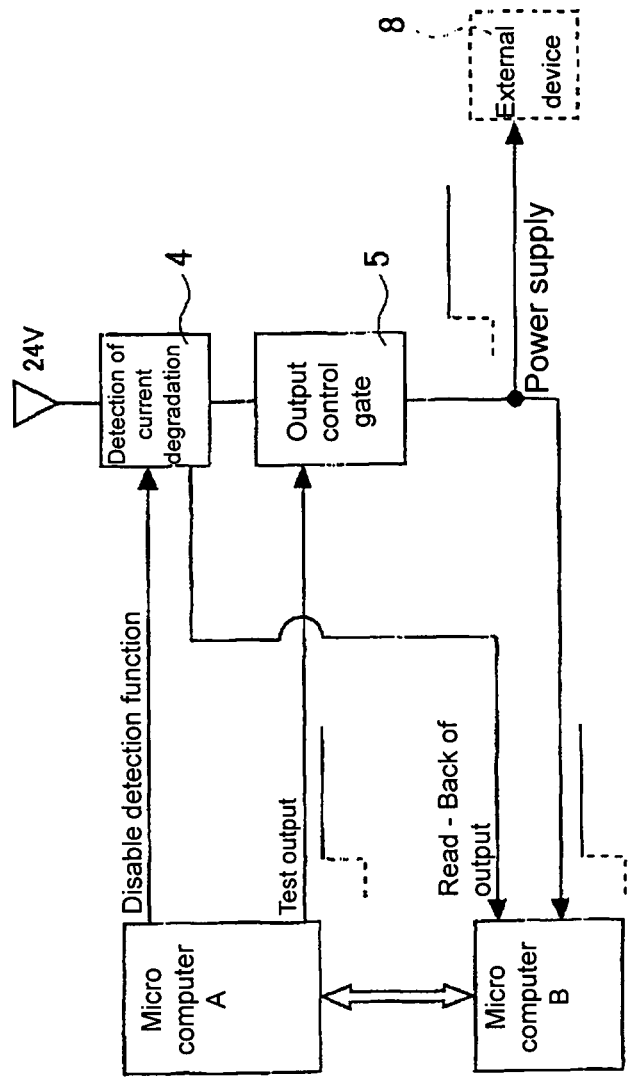
FIG. 9 shows an explanatory diagram of an operation related to the test terminal (Power Supply specification)

FIG. 8 shows an explanatory diagram of an operation related to the test terminal which is set in Muting Lamp specification. In this Muting Lamp specification, an on signal is output when the safety I/O terminal 1a is in a muting state to transmit muting lamp output to a muting lamp 9. According to the indicating state of the muting lamp, it can be judged whether or not the safety I/O terminal 1a is in a muting state. Then, FIG. 9 shows an explanatory diagram of an operation related to the test terminal which is in Power Supply specification. In this example, after configuration setting by the setting tool device 2, it becomes always on except for the case that an abnormal condition occurs. Accordingly, power can be supplied to the safety I/O terminal for the external device (input device or output device).

Figure 10:
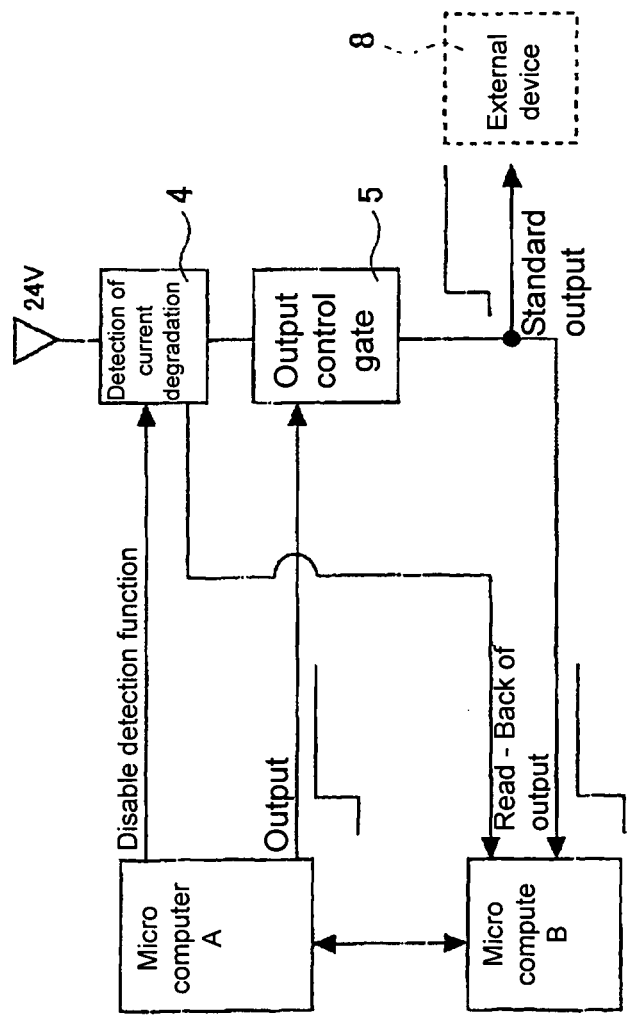
FIG. 10 shows an explanatory diagram of an operation related to the test terminal (Standard Output specification)

FIG. 10 shows an explanatory diagram of an operation related to the test terminal which is set in Standard Output specification. In this example, the external device functions as a PLC or an indicating lamp. A signal related to normality (in a normal operation) or abnormality (in an abnormal operation) as an operating state of the safety I/O terminal itself is transmitted from the test signal terminal Ttest. Here, the "normality" includes the case that any abnormality is not found in the self-diagnosis result of the safety I/O terminal. When an indicating lamp is connected to the test terminal Ttest, the state of the indicating lamp switches lighting or blinking in accordance with the signal. Accordingly, the state of the safety I/O terminal can be recognized in accordance with the content of the PLC data or state of the indicating lamp.

Figure 11:
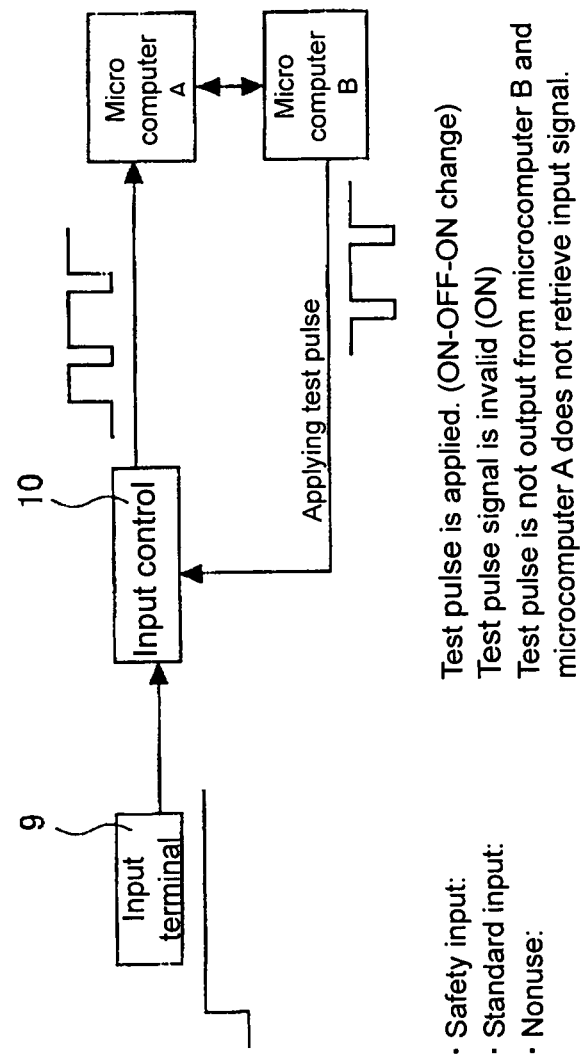
FIG. 11 shows an explanatory diagram of operations related to each specification of the input terminal.

FIG. 11 shows an explanatory diagram of operations related to each specification of the input terminal (which corresponds to the input terminal Tin shown in FIG. 13). As shown in the figure, in case of Safety Input specification, test pulse (on-off-on change) is applied to an input control 10 and the input control 10 performs logical process on the input signal (a signal related to on-off state of the input device) which is input from an input terminal 9 with the pulse signal input from the microcomputer B to output the processed signal. The microcomputer A inputs the processed signal in order to use in self-diagnosis. In case of the Standard Input specification, the test pulse signal is invalid (on). In case of the Nonuse specification, test pulse signal is not output from the microcomputer B and the microcomputer A does not retrieve the input signal. Although not shown in the figure, when the specification of the input terminal 9 is in Test Out specification, the specification of the test terminal Ttest (not shown) is also in "Test Out specification." Accordingly, as described above, pulse signal is input from the test terminal Ttest into the input device, a response signal input from the input device is input into the input terminal 9, and the microcomputer determines whether or not the state of the input device is normal or abnormal based on the input condition. That is, it is determined as a normal condition when the response is in a proper condition and it is determined as an abnormal condition when the response is not in a proper condition.

Figure 12:
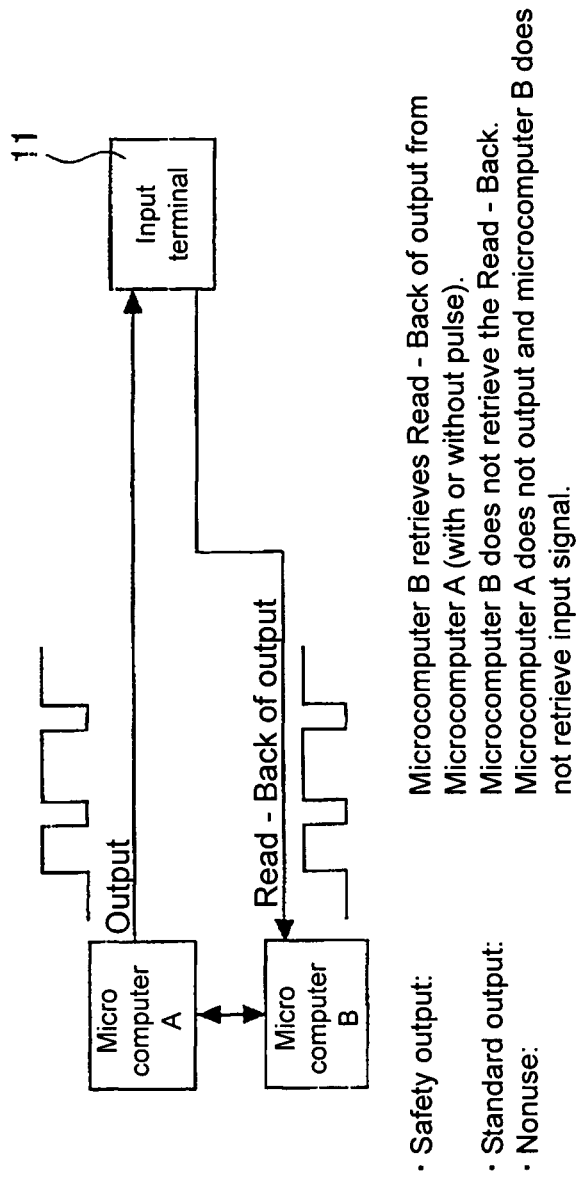
FIG. 12 shows an explanatory diagram of operations related to each specification of the output terminal.

Finally, FIG. 12 shows an explanatory diagram of operations related to each specification of the output terminal. As shown in the figure, in case that the specification of an output terminal 11 of the safety terminal 1a (which corresponds to the output terminal Tout shown in FIG. 13) is in "Safety Pulse Test specification," a test pulse generated by the microcomputer of the safety I/O terminal 1a is output form the output terminal 11 to the output device. Concretely, the microcomputer of the safety I/O terminal 1a outputs a predetermined pattern of pulse signal to the output device connected to the output terminal 11, read-backs the signal transferred via the output device to determine whether or not the output device is in a normal condition. It determines that the output device is in a normal condition when a proper test pulse is received from the output device and it determines the output device in an abnormal condition when test pulse an improper pattern is received or nothing is received. Accordingly, presence of abnormality in the output device or wiring can be detected by the safety I/O terminal 1a.

As described above, when the test terminal, the output terminal, and the input terminal are set in predetermined specifications, operations shown in FIGS. 7 to 12 are carried out and terminal specifications of each terminal is led by terminal specifications based on the terminal specification setting information.

Therefore, according to the safety I/O terminal 1a, when the terminal specification setting information stored in the EEPROM 106 in the terminal 1a is arbitrarily rewritten from the computer 2 via a network, the input terminal 103, the output terminal 104, and the test terminal 105 operate based on the rewritten information. Accordingly, the terminal specifications of each terminal (Tin, Tout, and Ttest) are automatically switched to preferable values and set. As a result, a single safety I/O terminal allows switching the structures of the input terminal Tin, the output terminal Tout, and the test terminal Ttest arbitrarily and a flexible system structure may be realized by adjusting them in accordance with the input device or output device to be controlled.

Here, the input terminal, the output terminal, and the test terminal of the safety I/O terminal 1a is explained, however, the same structure may be employed in an I/O unit in a safety network controller. The I/O unit connected to a building type safety network controller may have a structure including an input terminal Tin, an output terminal Tout, and a test terminal Ttest. The difference between the I/O unit and the safety I/O terminal is found in the way of communication with a CPU unit. The safety I/O terminal performs data communication with a master function of the safety network controller and the I/O unit performs data communication with the CPU unit of the safety network controller via internal bus which is common to each unit. Devices connected to each terminal of the I/O unit are same as those in case of the safety I/O terminal. Examples for input devices are an emergency stop switch SW, light curtain, door switch, and two-hand switch and examples for output devices are a safety relay and a contactor. These input devices and output devices are compliant with safety standards. Further, the I/O unit includes units corresponding to the microcomputer 101, the EEPROM 106, the input unit 103, the output unit 104, the testing unit 105, and terminals Tin, Tout, and Ttest shown in FIG. 13. Here, the structure corresponding to the transmission and reception unit 102 is a transmission and reception unit of the internal bus.

In this I/O unit, five setting specifications regarding the test terminals may be set from a setting tool device 2 and those are Nonuse specification (Not Used), Standard Output specification (Standard Output), Test Out specification (Pulse Test Output), Power Supply specification (Power Supply Output), and Muting Lamp specification (Muting Lamp Output). Four setting specifications regarding the input terminals are provided and those are Nonuse specification (Not Used), Test Out specification (Test pulse from test out), Safety Input specification (Used as safety input), and Standard Input specification (Used as standard input). Further, three setting specifications regarding the input terminals are provided and those are Nonuse specification (Not Used), Safety Input specification (Safety), and Safety Pulse Test specification (Safety Pulse Test).

According to the present invention, a safety device which is flexibly adapted to an input device or output device having various functions and various terminal structures with a single device can be realized.

What is claimed is:

1. A safety I/O terminal for connecting to an input device designed based on a safety standard, to which an on-off signal is input, connecting to a safety controller designed based on the safety standard via a network, and transmitting an input signal from the input device to a communication master unit of the safety controller, comprising:
   one or more input terminals configured to be given the input signal from the input device compliant with the safety standard;
   a test terminal, configured to be used in a test out specification in combination with at least one of a nonuse specification, a standard output specification, a power supply specification and a muting lamp specification;
a memory configured to store a specification setting regarding the test terminal, wherein the specification setting allows the safety I/O terminal to switch the structure of the one or more input terminals and test terminal in accordance with the input device to be controlled; and
a microcomputer configured to output a test signal for determining presence of abnormality when the specification setting regarding the test terminal is specified as the test out specification and to carry out a process regarding the test terminal based on the specification setting when the specification setting regarding the test terminal is specified as one of the other specifications, in accordance with the specification setting in the memory, wherein the process includes at least one of:
stopping use of an output from the test terminal when the specification setting is specified as the "nonuse specification",
outputting a signal regarding operating conditions of the safety I/O terminal from the test terminal when the specification setting is specified as the "standard output specification",
outputting power voltage from the test terminal when the specification setting is specified as the "power supply specification", and
outputting a signal to a muting lamp from the test terminal when the specification setting is specified as the "muting lamp specification".

2. A safety I/O terminal for connecting to an input device designed based on a safety standard, to which an on-off signal is input, connecting to a safety controller designed based on the safety standard via a network, and transmitting the on-off signal input from the input device to a communication master unit of the safety controller, comprising:
one or more input terminals configured to be given the input signal from the input device compliant with the safety standard;
a test terminal configured to be shared in two or more of a test out specification, a muting lamp specification, a power supply specification, a standard output specification, and a nonuse specification;
a memory configured to store a specification setting regarding the test terminal, wherein the specification setting allows the safety I/O terminal to switch the structure of the one or more input terminals and test terminal in accordance with the input device to be controlled; and
a microcomputer configured to switch processes regarding the test terminal in accordance with the specification setting in the memory wherein the processes include at least one of:
stopping use of an output from the test terminal when the specification setting is specified as the "nonuse specification",
outputting a signal regarding operating conditions of the safety I/O terminal from the test terminal when the specification setting is specified as the "standard output specification",
outputting power voltage from the test terminal when the specification setting is specified as the "power supply specification", and
outputting a signal to a muting lamp from the test terminal when the specification setting is specified as the "muting lamp specification".

3. The safety I/O terminal according to claim 1, wherein
the safety I/O terminal is connected so as to communicate with a setting tool device for setting operation for the test terminal,
a preferable specification regarding the test terminal is determined by receiving a signal of setting operation from the setting tool device,
a content of setting is stored in the memory, and
after the setting, the microcomputer switches processes regarding the test terminal in accordance with the specification setting in the memory.

4. A safety device, comprising:
at least one of an input unit having one or more input terminals and an output unit having one or more output terminals;
a testing unit having one or more test terminals;
a rewritable nonvolatile memory configured to store setting information of a terminal specification which can be set from outside via a tool, wherein the setting information allows the safety I/O terminal to switch the structure of the one or more input terminals, the one or more output terminals and the one or more test terminals in accordance with an input device to be controlled, and wherein
the terminal specification of the one or more test terminals included in the testing unit is determined in accordance with the setting information of the terminal specification wherein the terminal specification of the test terminal includes at least one of a test out specification, a muting lamp specification, a power supply specification, a standard output specification, and a nonuse specification, and
wherein the setting information is configured to perform at least one of:
stopping use of an output from the test terminal when the specification setting is specified as the "nonuse specification",
outputting a signal regarding operating conditions of the safety I/O terminal from the test terminal when the specification setting is specified as the "standard output specification",
outputting power voltage from the test terminal when the specification setting is specified as the "power supply specification", and
outputting a signal to a muting lamp from the test terminal when the specification setting is specified as the "muting lamp specification".

5. The safety device according to claim 4, wherein
the terminal specification of the one or more input terminals included in the input terminal is determined in accordance with the setting information of the terminal specification.

6. The safety device according to claim 4, wherein
the terminal specification of the one or more output terminals included in the output terminal is determined in accordance with the setting information of the terminal specification.

7. The safety device according to claim 4, wherein
the terminal specifications of the one or more input terminals included in the input terminal and the one or more output terminals included in the output terminal are both determined in accordance with the setting information of the terminal specification setting information.

8. The safety device according to claim 4, wherein
the terminal specification of the input terminal includes at least one of a safety input specification, a standard specification, and a nonuse specification.

9. The safety device according to claim 4, wherein
the terminal specification of the output terminal includes at least one of a safety output specification, a standard specification, and a nonuse specification.

* * * * *